United States Patent [19]

Mizuno et al.

[11] Patent Number: 4,940,924
[45] Date of Patent: Jul. 10, 1990

[54] POSITIONING CONTROL APPARATUS

[75] Inventors: Shigeki Mizuno; Takaharu Ueda; Tetsu Yamamoto, all of Amagasaki, Japan

[73] Assignee: Mitsubishi Denki Kabushiki Kaisha, Tokyo, Japan

[21] Appl. No.: 389,059

[22] Filed: Aug. 3, 1989

[30] Foreign Application Priority Data

Aug. 22, 1988 [JP] Japan .................................. 63-207722

[51] Int. Cl.$^5$ ......................................... G05D 23/275
[52] U.S. Cl. .................................... 318/560; 318/561; 318/621; 318/638; 318/632; 360/77.02; 360/77.05
[58] Field of Search ............... 360/73.01, 73.07, 73.13, 360/77.01, 77.06, 77.07, 77.16, 77.17, 78.01, 78.05, 78.07, 78.08, 78.11, 78.14

[56] References Cited

U.S. PATENT DOCUMENTS

| | | | |
|---|---|---|---|
| 3,917,930 | 11/1975 | Davey et al. | 318/561 |
| 4,092,682 | 5/1978 | Andrews, Jr. et al. | 360/77.02 X |
| 4,092,683 | 5/1978 | Andrews, Jr. et al. | 360/77.02 X |
| 4,179,730 | 12/1979 | Antonov et al. | 318/561 X |
| 4,200,827 | 4/1980 | Oswald | 318/561 |
| 4,341,986 | 7/1982 | Browder | 318/621 X |
| 4,345,194 | 8/1982 | Green | 318/632 X |
| 4,724,370 | 2/1988 | Moraru et al. | 318/687 X |
| 4,742,285 | 5/1988 | Sasaki et al. | 318/636 X |
| 4,748,393 | 5/1988 | Fincher et al. | 318/638 |
| 4,833,551 | 5/1989 | Song | 360/77.05 |

OTHER PUBLICATIONS

"Design of a Disk File Head-Positioning Servo" IBM Journal of Research and Development, vol. 18, No. 6, Nov. 1974.

Primary Examiner—William M. Shoop, Jr.
Assistant Examiner—Paul Ip
Attorney, Agent, or Firm—Wolf, Greenfield & Sacks

[57] ABSTRACT

The positioning control apparatus includes a feedback compensatory compensatory system for performing high-accurate positioning and a feedforward compensatory system for carrying out high-speed output response. The feedforward compensatory system is provided with a dynamic characteristic of an object to be controlled and a dynamic characteristic reverse to that of a control system by a feedback compensation. Transfer characteristic from a position command to an output of the object is assumed to be 1. As a result, there can be easily obtained a desired output response as well as a desired control input.

17 Claims, 7 Drawing Sheets

POSITIONING CONTROL APPARATUS

BACKGROUND OF THE INVENTION

1. Field of the Invention

The present invention relates to a positioning control apparatus, and more particularly, to an apparatus for performing positioning at high speed with high accuracy.

2. Description of Related Art

Figure 1:
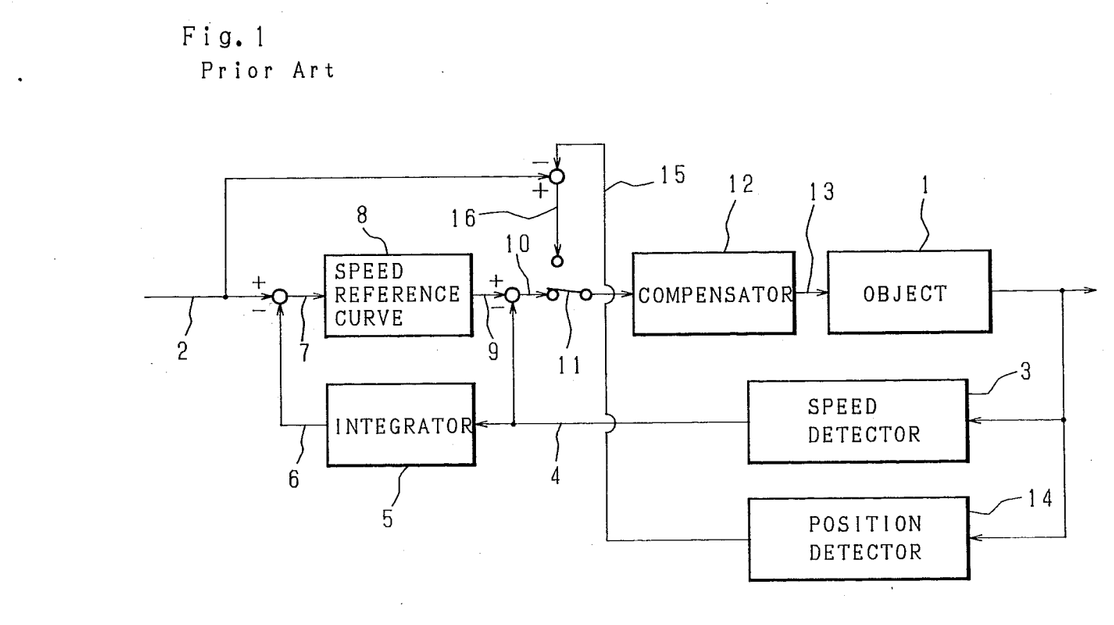
FIG. 1 is a block diagram of the positioning control apparatus of the prior art.

FIG. 1 is a block diagram illustrating a positioning control apparatus with a switching manner between speed control and positioning control which has generally been adopted as a head-positioning control apparatus for use in a magnetic disc apparatus. FIG. 1 is a typical example of the positioning control apparatus operating at high speed with high accuracy. The apparatus is described in such references as ① R. K. Oswald, Design of a Disk Head-Positioning Servo, IBM Journal of Research and Development, vol. 18, No. 6, November 1974, ② R. K. Oswald, Head Positioning Servo Design For The IBM 3344/3350 Disk Files, IEEE TRANSACTIONS ON MAGNETICS, vol. MAG-14, No. 4, July 1978, ③ Takanami et al., Peripheral Circuits for 3.2 GByte Multi-Device Disk Storage, Transactions On Research and Utility By Nippon Telephone and Telegraph Company, vol. 31, No. 1, 1982.

In the description described hereinafter, a command will be assumed to be referred to as a command signal. In FIG. 1, reference numeral 1 designates an object to be controlled, concretely, a motor and an access head integrated with the motor. A speed signal 4 (a speed of the access head) of the object 1 is detected by a speed detector 3. The speed signal 4, then, is converted to a position signal 6 by an integrator 5, and a position error 7 between the position signal 6 and a position command 2 is obtained. A speed error 10, which is the difference between the speed signal 4 and a speed command 9 obtained with respect to the position error 7 from a speed reference curve 8 (a speed-position curve when the object 1 being accelerated at the maximum acceleration and decelerated at uniform deceleration), is inputted to a compensator 12 through a switch 11. In the compensator 12, frequency of the inputted speed error 10 is amplified and attenuated, and a control input 13 is outputted by the compensator 12 to the object 1. A position signal 15 (a position of the access head) of the object 1 is detected by a position detector 14, and a position error 16 between the position signal 15 and the position command 2 is inputted to the compensator 12 through the switch 11. In the compensator 12, frequency of the inputted position error 16 is amplified and attenuated, and the control input 13 is outputted by the compensator 12 to the object 1.

A positioning control apparatus of the prior art comprises both a speed control system for obtaining output response at high speed and a position control system for performing positioning with high accuracy. Those control systems arranged in parallel to each other can be switched over between the speed control system and the position control system by the switch 11, whereby positioning control is carried out at high speed with high accuracy.

Operations of the both control systems will now be described below. In the speed control system, the speed signal 4 is controlled so as to be in accord with the speed command 9 by such a process as that feedback compensation is applied through the compensator 12 to the speed error 10 between the speed command 9 and the speed signal 4 detected from the object 1 by means of the speed detector 3, and that the control input 13 is generated therein.

Figure 2:
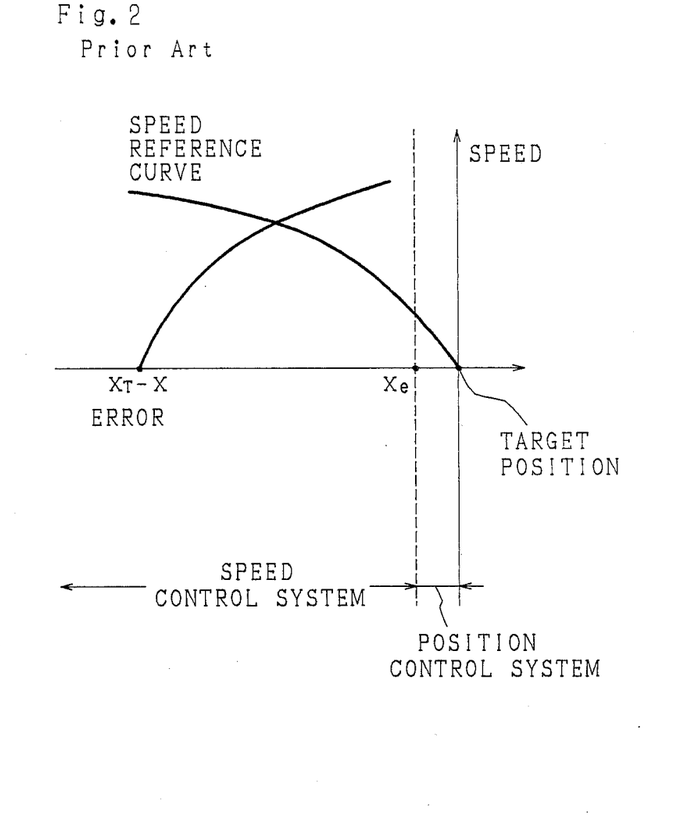
FIG. 2 is a view showing a speed reference curve employed in the positioning control apparatus of the prior art.

In order that a high-speed control is performed, however, there exists a problem of saturation of the control input 13 to the object 1. In order to obtain high-speed response by a control performing only the feedback compensation, it is necessary to momentarily provide an excessive control input. Then, in order to carry out high-speed control within the limits of control input, the apparatus of the prior art has employed a quadratic curve called a speed reference curve as shown in FIG. 2 so as to obtain the speed command 9. When the object is accelerated, electric current to be limited is brought into saturation by such as a driving amplifier, and when the object is decelerated, approximately two thirds of the electric current in comparison to that in acceleration is consumed so as to uniformly decelerate the object. This speed reference curve is established from the relation between a speed and a moving distance when the uniform accelerated motion is performed as will be described below. According to the relation between the speed v and the time t when the object is accelerated at uniform acceleration a, there is established such an equation as:

$$v = at \qquad (1)$$

In addition, according to the relation between the moving distance s and the time t when the object is accelerated at uniform acceleration a, there is established such an equation as follows:

$$s = at^2/2 \qquad (2)$$

Since the moving distance s to be required is an error between a target position $x_T$ and a present position x, if the time t is eliminated by such equations (1) and (2) as described above, the speed reference curve is established to be such an equation as follows:

$$v = \sqrt{2a(x_T - x)} \qquad (3)$$

In the position control system, there is performed such control as to make the position signal 15 accord with the position command 2 by such a process as that feedback compensation is applied through the compensator 12 to the position error 16 between the position command 2 and the position signal 15 detected from the object 1 by means of the position detector 14, and that the control input 13 is thereby generated.

In the positioning control apparatus of the prior art, in order to realize high-speed positioning with high accuracy with as little control input as possible, a control for permitting high-speed movement and a control for carrying out high-accurate positioning have been performed by different systems. Both control systems can be switched over by the switch 11, however, it is necessary to decide both the switching conditions and the characteristics of both control systems so that the transient response simulated in accordance with the initial position and the initial speed at the time for a switch over can be allowed. In FIG. 2, $x_e$ designates a switching position.

As may be seen from the above description, in the positioning control apparatus of the prior art, in order to perform positioning control at high speed with high accuracy, control for high-speed movement has been realized in the speed control system, and so has been done control for high-accurate positioning in the position control system, respectively, whereby control is performed by switching over both control systems. This apparatus, however, has three problems as follows:

1. Since basically two control systems are switched over, transient response will be brought about unless the speed when those systems are switched over is made completely to be null, as a result, settling time will be longer.
2. Since the switching point is decided by simulating the transient response with trial and error, the control systems can not readily be designed.
3. The manner of switching over the systems makes those control systems complicated as well as a lot of circuits required therein result in more cost.

SUMMARY OF THE INVENTION

The control system of the apparatus of the present invention has both a feedback compensatory system and a feed-forward compensatory system. The feedback compensatory system comprises a first compensator and a position detector for detecting a position of an object to be controlled, and the feedforward compensatory system comprises a second compensator, a filtering means having a dynamic characteristic reverse to that of a system which consists of the second compensator and the feedback compensatory system, and a filtering means with a dynamic characteristic equal to that of the object. An input command signal to the control system is assumed to be a desired control signal with respect to the object.

The control system may also be adapted so that one portion of the feedforward compensatory system is eliminated, a signal after the input command signal is passed through the eliminated portion is stored in a memory, and when control is performed, the stored data in the memory is inputted to the other non-eliminated portion of the feedforward compensatory system.

The input command signal is selected so that an input signal to the second compensator and an input signal to the feedback compensatory system can be a continuous function of time.

It is an object of the invention to provide a positioning control apparatus capable of simultaneously performing both a high-speed response and a high-accurate positioning through an input is small.

It is another object of the invention to provide a positioning control apparatus wherein the high-speed response and the high-accurate positioning can more readily be realized by providing such a memory as described above.

It is a further object of the invention to provide a positioning control apparatus wherein positioning without transient response can be performed with a simple control system by selecting the input command signal as described above.

The above and further objects and features of the invention will more fully be apparent from the following detailed description with accompanying drawings.

DESCRIPTION OF THE PREFERRED EMBODIMENTS

Figure 3:
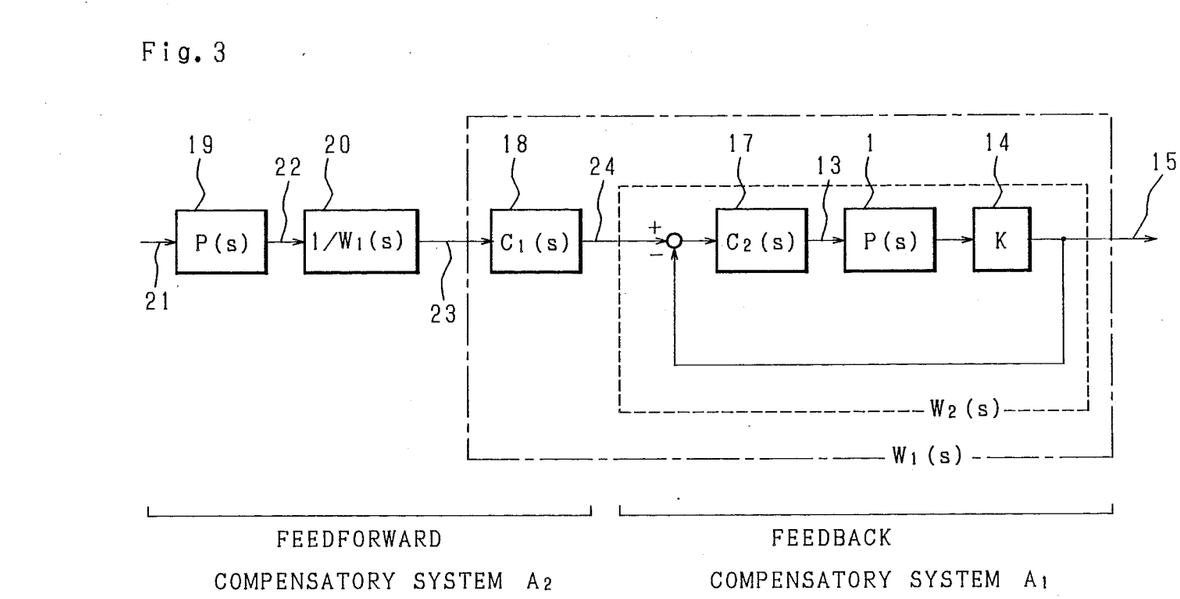
FIGS. 3 and 4 are block diagrams showing one embodiment of the positioning control apparatus of the present invention.

FIG. 3 illustrates one embodiment of the present invention, wherein reference numeral 1 designates an object to be controlled, which is an actuator (a motor and an access head integrated with the motor) employed in such as a magnetic disc driving apparatus. The object 1 is connected to a position detector 14 for detecting a position of the object 1, from the position detector 14 a position signal 15 being outputted to the object 1. The object 1 is also connected to a compensator 17, from which a control input 13 is sent to the object 1. A feedback compensatory system $A_1$ comprises the object 1, the position detector 14, and the compensator 17. The following means are being connected in series to the feedback compensatory system $A_1$ from a compensator 18 for smoothing response of the control system, a filter 20 having a dynamic characteristic reverse to that of a system where the feedback compensatory system $A_1$ and the compensator 18 are connected, and to a filter 19 with a dynamic characteristic equal to that of the object 1. An input command 21 is inputted to the filter 19, from which a positioning command 22 is outputted to the filter 20, from which a command signal 23 of the control system is outputted to the compensator 18. A differential signal between the position signal 15 and a control signal 24 outputted from the compensator 18 is inputted to the compensator 17. A feedforward compensatory system $A_2$ comprises the filter 19, the filter 20, and the compensator 18.

In FIG. 3, reference characters in each block designate dynamic characteristics of each block, and character s designates a Laplacean and so does character K a gain of the position detector 14.

Now a closed-loop characteristic $W_2$ and a characteristic $W_1$ of the control system both being shown in FIG. 3 will be defined, respectively as such equations (4) and (5) as follows:

$$W_2(s) = \frac{K \cdot C_2(s) \cdot P(s)}{1 + K \cdot C_2(s) \cdot P(s)} \quad (4)$$

$$W_1(s) = C_1(s) \cdot W_2(s) \quad (5)$$

The control system of the apparatus of the present invention has such feedforward compensatory system $A_2$ and feedback compensatory system $A_1$ both being described above in order to perform, positioning at high speed with high accuracy. In this control system, high speed is maintained in the feedforward compensatory system $A_2$, and so is high accuracy in the feedback compensatory system $A_1$. That is to say, high-speed response of the control system is realized with both feedforward compensatory system $A_2$ and the input command 21, and high accuracy of the control system is realized with the feedback compensatory system $A_1$, respectively. Since the feedforward compensatory system $A_2$ and the feedback compensatory system $A_1$ are connected in series to each other, the control system has no need of being switched, by which operation the transient response is affected, then positioning at high speed with high accuracy can be realized by one control system alone. Furthermore, the control system of the apparatus of the invention can have each individual design for the high speed response and for the high-accurate positioning.

The input command 21 is selected so that the control input 13 can be small, that the position signal 15 can have a high speed output response and that the command signal 23 of the control system can be a continuous function.

Because the filter 20 has the dynamic characteristic reverse to the characteristic $W_1(s)$ of the control system, the transfer characteristic from the position command 22 to the position signal 15 becomes 1, and the position signal 15 is in accord with the position command 22. If the object 1 is in accord with the filter 19, the value of the input command 21 becomes the same with that of the control input 13. As a result, in order to satisfy the limitation of the control input 13, there may be produced a wave form with both the upper and the lower limits as the input command 21.

A practical example of the design will now be described below.

Assuming that a moment of inertia of the object 1 which is an actuator is normalized to be 1, the dynamic characteristic $P(s)$ of the object 1 is designated by such an equation (6) as will be described below. In addition, gain K of the position detector 14 is also assumed to be 1.

$$P(s) = 1/s^2 \tag{6}$$

The following equation, for example, will be selected for $C_2(s)$.

$$C_2(s) = \gamma \times (s+\beta)/(s+\alpha) \tag{7}$$

According to the above equation (4) and such equations (6) and (7) as described above, the closed-loop characteristic $W_2(s)$ will be designated by the following equation.

$$W_2(s) = \gamma \times (s+\beta)/(s^3+\alpha s^2+\gamma s+\beta\gamma) \tag{8}$$

Now, with consideration of only making the closed-loop characteristic stable, $\alpha$, $\beta$ and $\gamma$ are decided.

Assuming that $C_1(s)=1$ is made, such an equation as $W_1(s)=W_2(s)$ will be established by the above equation (5). In other words, the reverse dynamic characteristic: $1/W_1(s)$ of the control system will be shown by the following equation:

$$1/W_1(s) = (s^3+\alpha s^2+\gamma s+\beta\gamma)/(\gamma \times (s+\beta)) \tag{9}$$

The command signal 23 of the control system is calculated by adding the equation: $1/W_1(s)$ to the position command 22. The signal is easily differentiated, but it is difficult to perform such integration as $1/(s+\beta)$. Then, in the embodiment of the present invention, $C_1(s)$ is decided to be such an equation (11) as will be described below so that the reverse dynamic characteristic: $1/W_1(s)$ can be shown by an equation (10).

$$1/W_1(s) = s^3+\alpha s^2+\gamma s+\beta\gamma \tag{10}$$

$$C_1(s) = 1/(\gamma \times (s+\beta)) \tag{11}$$

Figure 4:
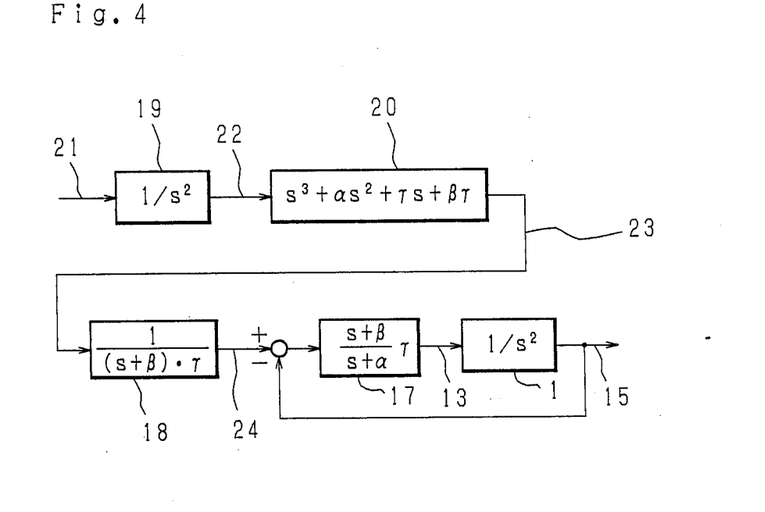

Such concrete transfer functions of each block as described above will all together be illustrated in FIG. 4.

Figure 5A:
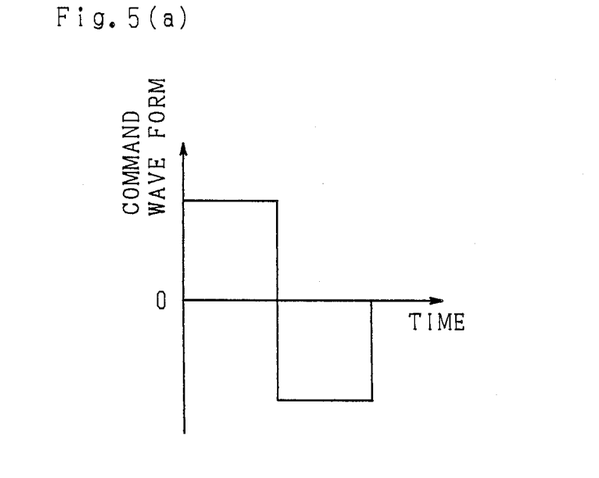
FIGS. 5a and 5b are charts illustrating a wave form of the input command signal and a differential wave form thereof.
Figure 5B:
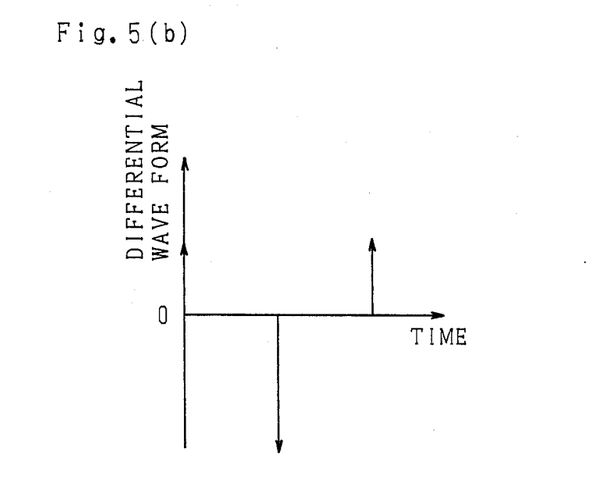

The input command 21 has a waveform with the upper and the lower limits as described before, therefore, high-speed response can be shown in the position command 22 with both the maximum acceleration and deceleration of the object 1. Such a waveform as shown in FIG. 5(a) may be proposed for the input command 21. There being considered that the transfer function in the filter 19 is a double-integral, the command signal 23 can be obtained by adding all of a double-integral, single-integral, null-differential and single-differential of the input command 21 together. Assuming that the input command 21 is such a waveform as shown in FIG. 5(a), the single-differential waveform thereof is the one as shown in FIG. 5(b) having a non-continuity point. The non-continuity point causes transient action on the response waveform of the position signal 15, as a result, the settling time thereof becomes longer.

Figure 6A:
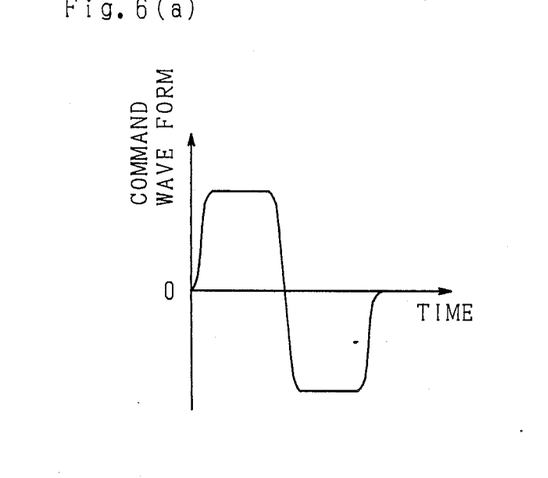
FIG. 6 is a chart illustrating a wave form of the input command signal and a differential wave form thereof both in one embodiment of the present invention.
Figure 6B:
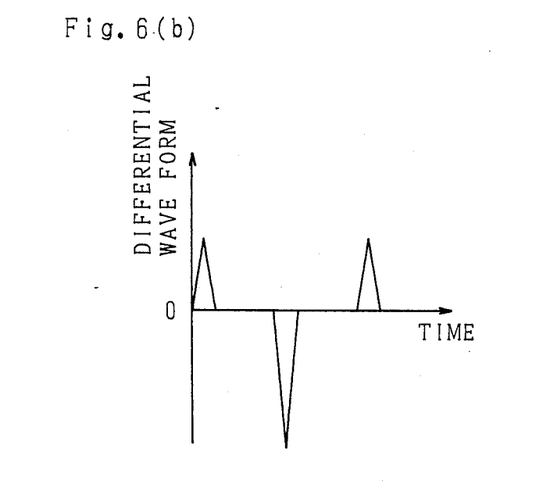

Then, in the embodiment of the present invention, there is employed a waveform (FIG. 6(a)) as the input command 21, so that the single-differential waveform (FIG. 6(b)) can be continuous in time.

When the input command 21 is produced, it is necessary to give thought to the following points. One is that the input command 21 must be produced so that the upper and the lower limits of the waveform thereof can be reduced after consideration of smoothness (continuity of n-time differential) thereof. The other is that the waveform of the input command 21 is produced so that the steady state value of the position command 22 can be the moving distance necessary at present.

Figure 7:
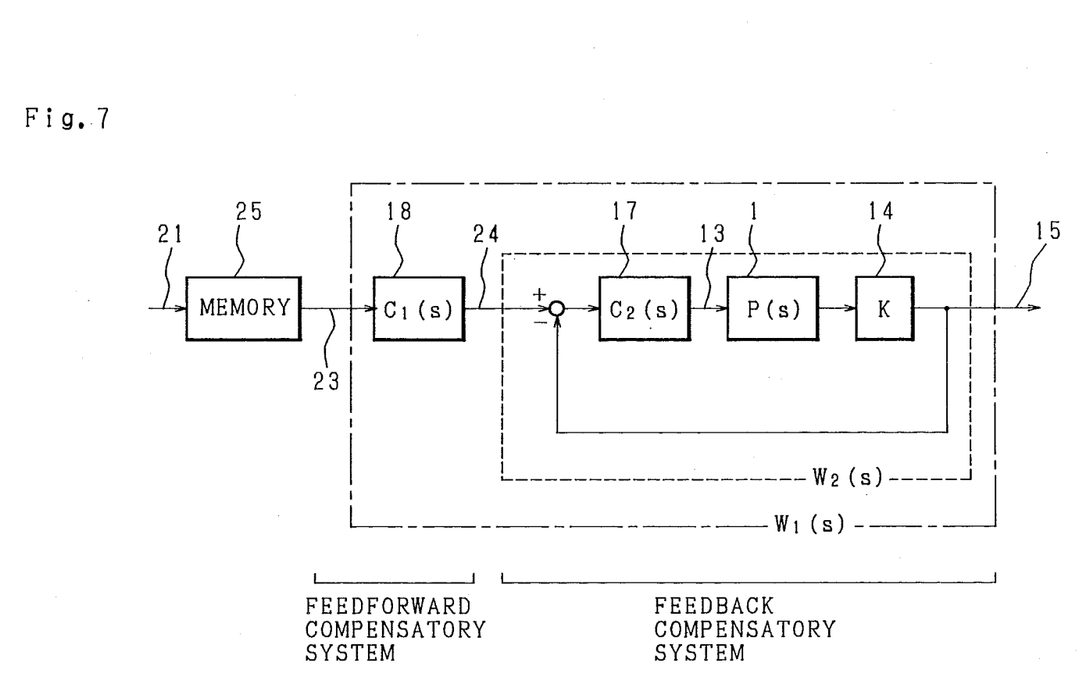
FIG. 7 is a block diagram showing another embodiment of the positioning control apparatus of the present invention.

As may be seen from the above equation (10), an exact differential is necessary in order to realize the characteristic of the filter 20, however, there exists a disadvantage that an imperfect differential is essentially necessary in order to realize the characteristic by an operational-amplifier circuit, and there is another disadvantage that noise with a high frequency is amplified. FIG. 7 is a block diagram of another embodiment of the present invention, wherein those elements numbered identically with the embodiment of FIGS. 1-2 perform the same or similar functions. In the embodiment of the present invention, a system with a dynamic characteristic reverse to that of the control system is realized as not hardware but software. It may be adapted that the command signal 23 of the control system is calculated in advance by means of the following equation (12) and, then, the obtained numeric data is stored in the memory 25. Then, when the control is carried out, the numeric data may be adapted to be read out from the memory 25 as the command signal 23 of the control system.

$$Yr(s) = P(s)/W_1(s).ur(s)$$

$$= s^3+\alpha s^2+\gamma s+\beta\gamma/s^2.ur(s) \tag{12}$$

In the above equation (12), Yr(s) designates the command signal 23 of the control system, and ur(s) designates the input command 21.

In the embodiment of FIG. 7 of the present invention, there is arranged the control system wherein the two blocks of both filters 19 and 20 are removed from the feedforward compensatory system $A_2$, however, there may also be arranged the control system wherein one portion in the block is removed.

Furthermore, in the embodiment of the present invention, an actuator is employed for the controlled object 1 and the degree of the compensator is to be a limited value, however, it goes without saying that each arrangement is not limited to as described above.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A positioning control apparatus for controlling the position of an object having a dynamic characteristic, comprising:
    a feedback compensatory system including detecting means for detecting a position of the object and a first compensator connected to the object; and
    a feedforward compensatory system including a second compensator operatively connected for signal provision to said feedback compensatory system, a first filtering means having a dynamic characteristic which is substantially the reverse of the dynamic characteristic to that of a system which is comprised of said second compensator and said feedback compensatory system, and a second filtering means having a dynamic characteristic which is substantially equal to the dynamic characteristic of the object, wherein said second filtering means is operatively connected for signal provision to said first filtering means, and said first filtering means is operatively connected for signal provision to said second compensator.

2. A positioning control apparatus as set forth in claim 1, wherein:
    a command signal is provided as an input to said positioning control apparatus which signal is substantially identical to a desired control signal to be applied to the object.

3. A positioning control apparatus as set forth in claim 2, wherein:
    said second filtering means, said first filtering means and said second compensator are connected in series, and said command signal is inputted to said second filtering means.

4. A positioning control apparatus as set forth in claim 3, wherein:
    said command signal is produced so that a first input signal to said second compensator and a second input signal to said feedback compensatory system can each be a continuous function of time.

5. A positioning control apparatus as set forth in claim 1, wherein:
    the object comprises a motor and a moving member integrated with the motor.

6. A positioning control apparatus as set forth in claim 5, wherein:
    the object comprises an actuator for moving a head in a disc driving apparatus.

7. A positioning control apparatus, comprising:
    a feedback compensatory system which has a detecting means for detecting a position of an object to be controlled and a first compensator connected to said object,
    a second compensator connected to said feedback compensatory system, and
    a storing means for storing data of a dynamic characteristic reverse to that of a system which is comprised of said second compensator and said feedback compensatory system.

8. A positioning control apparatus as set forth in claim 7, wherein:
    said data read from said storing means are inputted to said second compensator.

9. A positioning control apparatus as set forth in claim 7, wherein:
    said data are computed in response to an input command signal identical to a desired control signal to said object.

10. A positioning control apparatus as set forth in claim 7, wherein:
    said input command signal is produced so that an input signal to said second compensator and an input signal to said feedback compensatory system can be a continuous function of time.

11. A positioning control apparatus as set forth in claim 7, wherein connection of said second compensator to said feedback compensatory system is such that said second compensator is operatively connected for signal provision to said feedback compensatory system.

12. A positioning control apparatus as set forth in claim 11, wherein said data read from said storing means are inputted to said second compensator.

13. A positioning control apparatus as set forth in claim 11, wherein said data are computed in response to an input command signal identical to a desired control signal to said object.

14. A positioning control apparatus as set forth in claim 11, wherein said input command signal is produced so that an input signal to said second compensator and an input signal to said feedback compensatory system can be a continuous function of time.

15. Apparatus for controlling position of at least one object having a first dynamic characteristic, comprising:
    first means, adapted to receive an input signal indicating desired position of the object, for producing a first signal representative of the input signal processed by a dynamic characteristic substantially equal to the product of the first dynamic characteristic and a second dynamic characteristic;
    first compensating means, responsive to the first signal, for smoothing response of said apparatus by processing the first signal to produce a second signal; and
    a feedback loop, responsive to the second signal, comprising means for sensing position of the object and producing a position signal indicative thereof, means for combining the second signal and the position signal to produce a third signal, and second compensating means responsive to the third signal for providing a motion signal to the object,
    wherein the second dynamic characteristic is substantially equal to the inverse of the dynamic characteristic of a system comprising said first compensating means and said feedback loop.

16. Apparatus as set forth in claim 15 wherein said first means comprises storage means for storing and producing said first signal.

17. Apparatus as set forth in claim 15 wherein said first means comprises:

a first filter adapted to receive the input signal and having a dynamic characteristic substantially equal to the first dynamic characteristic; and a second filter, operatively connected to said first filter, having a dynamic characteristic substantially equal to the second dynamic characteristic and capable of producing the first signal.

* * * * *

UNITED STATES PATENT AND TRADEMARK OFFICE
CERTIFICATE OF CORRECTION

PATENT NO. : 4,940,924

DATED : July 10, 1990

INVENTOR(S) : Shigeki Mizuno, Takaharu Ueda, Tetsu Yamamoto

It is certified that error appears in the above-identified patent and that said Letters Patent is hereby corrected as shown below:

Claim 2, Col. 7, line 45, change "a command" to --an input command--;
Claim 2, Col. 7, line 47, change "control signal" to --control input signal--;
Claim 3, Col. 7, line 53, change "said command" to --said input command--;
Claim 4, Col. 7, line 57, change "said command" to --said input command--;
Claim 9, Col. 8, line 19, change "control signal" to --control input signal--;
Claim 9, Col. 8, lines 19-20, change "to said" to --to be applied to said--;
Claim 10, Col. 8, lines 23-24, change "an input" to --a first input--;
Claim 10, Col. 8, lines 24-25, change "an input" to --a second input--;
Claim 10, Col. 8, line 26, change "can be" to --can each be--;
Claim 13, Col. 8, lines 38-39, change "control signal" to --control input signal--;
Claim 13, Col. 8, line 39, change "to said" to --to be applied to said--;
Claim 14, Col. 8, line 42, change "an input" to --a first input--;
Claim 14, Col. 8, line 43, change "an input" to --a second input--;
Claim 14, Col. 8, line 44, change "can be" to --can each be--;
Claim 15, Col. 8, line 48, change "input signal" to --input command signal--;
Claim 15, Col. 8, line 48, change "indicating" to --for generating--;
Claim 15, Col. 8, line 50, change "input signal" to --input command signal--;

UNITED STATES PATENT AND TRADEMARK OFFICE
CERTIFICATE OF CORRECTION

PATENT NO. : 4,940,924

DATED : July 10, 1990

INVENTOR(S) : Shigeki Mizuno, et al

It is certified that error appears in the above-identified patent and that said Letters Patent is hereby corrected as shown below:

Claim 17, Col. 9, line 7, change "input signal" to --input command signal--.

Signed and Sealed this

Twenty-second Day of December, 1992

Attest:

DOUGLAS B. COMER

Attesting Officer

Acting Commissioner of Patents and Trademarks